United States Patent
Echols et al.

(10) Patent No.: US 11,373,083 B2
(45) Date of Patent: Jun. 28, 2022

(54) QUERY HAVING MULTIPLE RESPONSE PORTIONS

(71) Applicant: Lenovo (Singapore) Pte. Ltd., Singapore (SG)

(72) Inventors: Roderick Echols, Chapel Hill, NC (US); Ryan Charles Knudson, Durham, NC (US); Jonathan Gaither Knox, Morrisville, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 302 days.

(21) Appl. No.: 16/658,608

(22) Filed: Oct. 21, 2019

(65) Prior Publication Data

US 2021/0117754 A1  Apr. 22, 2021

(51) Int. Cl.
*G06N 3/00* (2006.01)
*G06F 16/9038* (2019.01)
*G06F 40/30* (2020.01)
*G06N 20/00* (2019.01)

(52) U.S. Cl.
CPC ......... *G06N 3/004* (2013.01); *G06F 16/9038* (2019.01); *G06F 40/30* (2020.01); *G06N 20/00* (2019.01)

(58) Field of Classification Search
CPC .... G06N 3/004; G06N 20/00; G06F 16/9038; G06F 40/30
See application file for complete search history.

(56) References Cited

U.S. PATENT DOCUMENTS

| | | | |
|---|---|---|---|
| 2009/0094133 A1* | 4/2009 | Oates | G06Q 10/087 705/26.1 |
| 2013/0174034 A1* | 7/2013 | Brown | G06F 16/951 715/708 |
| 2018/0052824 A1* | 2/2018 | Ferrydiansyah | G06F 40/30 |
| 2019/0303473 A1* | 10/2019 | Sen | G06F 16/2425 |

* cited by examiner

*Primary Examiner* — Seth A Silverman
(74) *Attorney, Agent, or Firm* — Ference & Associates LLC

(57) ABSTRACT

One embodiment provides a method, including: receiving, at a digital assistant of an information handling device, a query from a user comprising at least two response portions; determining responses for the at least two response portions, wherein the determining comprises separately processing each of the at least two response portions; and providing a response to the user comprising the responses. Other aspects are described and claimed.

18 Claims, 3 Drawing Sheets

QUERY HAVING MULTIPLE RESPONSE PORTIONS

BACKGROUND

Digital personal assistants (DPAs) have become a common-use piece of technology. Whether it is a standalone DPA or a DPA that is built into an information handling device, for example, a smartphone, tablet, personal computer, laptop, wearable device, or the like, the number of users utilizing DPAs is increasing. Up to this point, the queries directed to DPAs have been simple, single response questions. For example, a user may ask a DPA, "what is the capital of Idaho?" which would then cause the DPA to respond "Boise" or, possibly, provide a longer response like "the capital of Idaho is Boise." However, as the commonality of DPA use increases, the queries have become more complex, becoming more like conversations with other people. Yet the types of responses given by the DPA have remained primarily unchanged.

BRIEF SUMMARY

In summary, one aspect provides a method, comprising: receiving, at a digital assistant of an information handling device, a query from a user comprising at least two response portions; determining responses for the at least two response portions, wherein the determining comprises separately processing each of the at least two response portions; and providing a response to the user comprising the responses Another aspect provides an information handling device, comprising: a processor; a memory device that stores instructions executable by the processor to: receive, at a digital assistant of an information handling device, a query from a user comprising at least two response portions; determine responses for the at least two response portions, wherein the determining comprises separately processing each of the at least two response portions; and provide a response to the user comprising the responses.

A further aspect provides a product, comprising: a storage device that stores code, the code being executable by a processor and comprising: code that receives, at a digital assistant of an information handling device, a query from a user comprising at least two response portions; code that determines responses for the at least two response portions, wherein the determining comprises separately processing each of the at least two response portions; and code that provides a response to the user comprising the responses.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
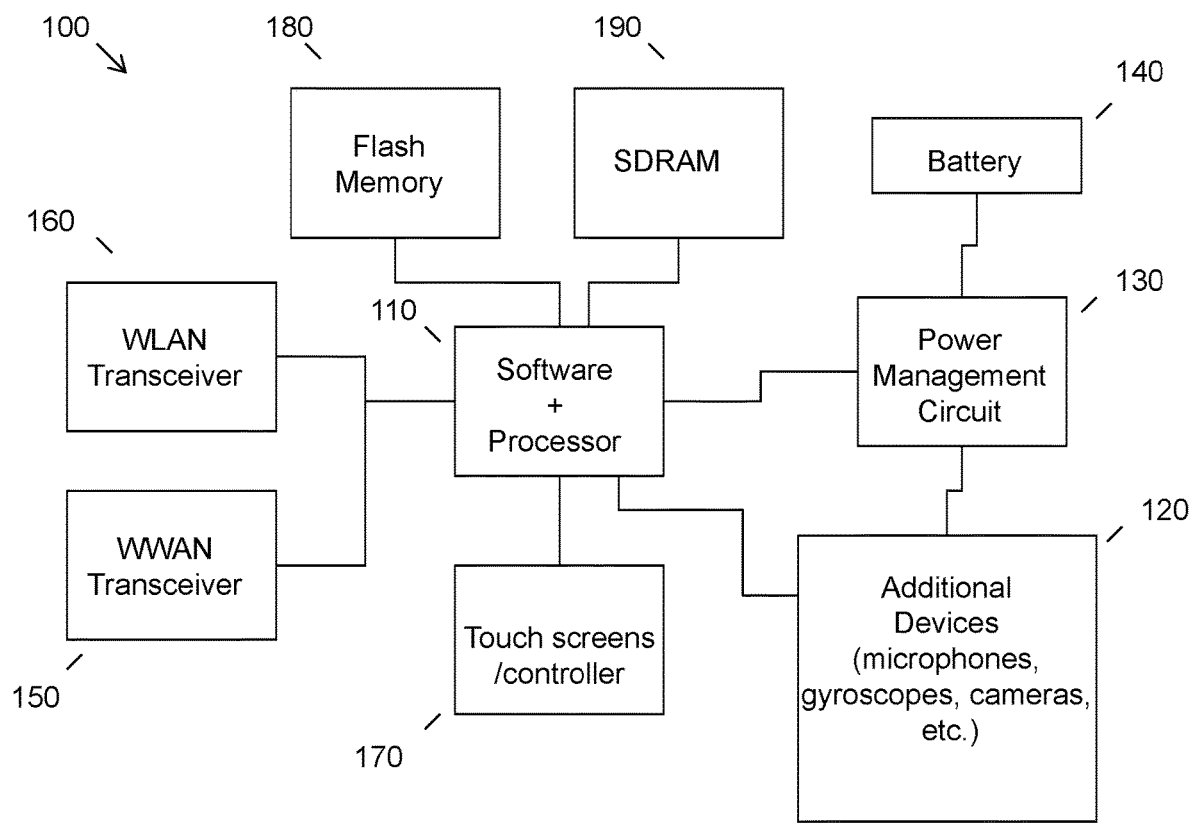
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, digital personal assistants (DPA), when responding to a query provided by a user, provide a response related to a single piece of information identified within the query. Recognition of this piece of information instructs a DPA to search for an answer and provide a response. Conventionally, DPAs are connected to the internet, permitting a user to query a DPA about, theoretically, anything. However, the DPAs are not designed to handle queries that include multiple parts that would require an individual response. In other words, conventionally the DPA is only able to handle a single query that would require a single response. If a user provides a query that would require multiple response portions, the DPA traditionally ignores the second or subsequent response portions and only provides a response to the first response portion.

One advancement has been programming the DPA to ask the user if more information regarding the topic is desired. For example, after the DPA provides a response to the user with respect to an initial query, the DPA may ask a user if they would like more information regarding the topic that was initially asked about if the DPA has recognized that additional information is available. For example, a user may ask "when was Abraham Lincoln born?" and a DPA may respond with "Feb. 12, 1809. Would you like to know about other celebrities born on this date?" The user can then provide a response back to the DPA. However, this still limits the DPA to processing a single response portion and does not address when the user has provided a query that includes multiple response portions, or parts of a query that require a response. In other words, using this technique, the user may be provided with information regarding more than one query portion; however, to receive the responses for each query portion, the query portions must be provided as single unique queries, thereby requiring the user to remain engaged and provide the necessary responses back to a DPA.

In the situation where a user queries a DPA with a multiple answer question, the DPA may respond in one of two ways. The first way may be responding only to the first piece of information being queried about. The second way may be responding to the portion of the query that has the strongest/more common response. For example, a user may query "what time does the rock show start and is it going to rain tonight?" A DPA will provide a partial response to this question because it requires two separate searches regarding the information present in the query. As a continued example, a system may respond with "the rock show starts at 7 pm ET," regarding the first part of the query, or a system may respond with "there is no rain in the forecast tonight," because the system may have quicker access to information regarding weather than the start time of the rock show. However, the other portion of the query will be ignored by the DPA and the user will not receive a response to the ignored portion. As mentioned previously, to receive a response to both portions within the query, a user must provide two separate queries.

Accordingly, an embodiment provides a method for providing a query containing multiple parts, also referred to as response portions, to a digital personal assistant (DPA) and the DPA providing a single fluid response back to user that provides responses to each response portion present within the query. In other words, and used as a non-limiting example, a user query containing two separate topics or two separate response portions (e.g., portions of the query that require a unique response) will result in a response from the DPA that answers the query completely, thus, including two responses, one for each response portion. For example, a user may ask "what time is the concert and will there be rain tonight?" The DPA may respond with the fluid response of, "The concert starts at 7 pm and there is a 20 percent chance of rain tonight." A system may provide the information related to multiple response portions present in a query in a clear and easy way for understanding, and may use machine learning techniques to provide more accurate and efficient responses over time.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
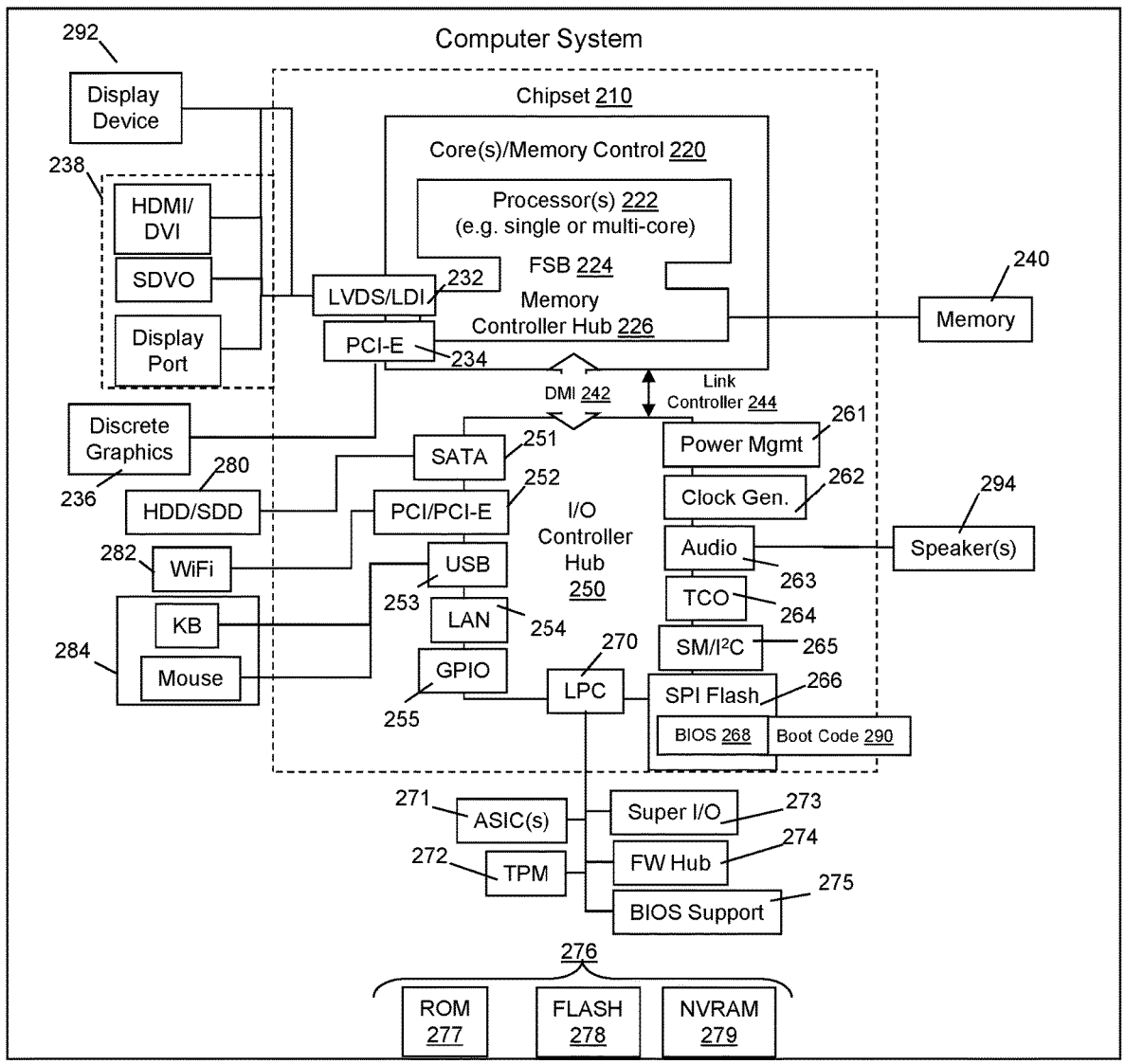
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart TVs, laptops, virtual or augmented, or mixed reality head mounted devices, and/or other electronic devices that may include digital assistants. For example, the circuitry outlined in FIG. 1 may be implemented in a tablet or smart phone embodiment, whereas the circuitry outlined in FIG. 2 may be implemented in a laptop.

Figure 3:
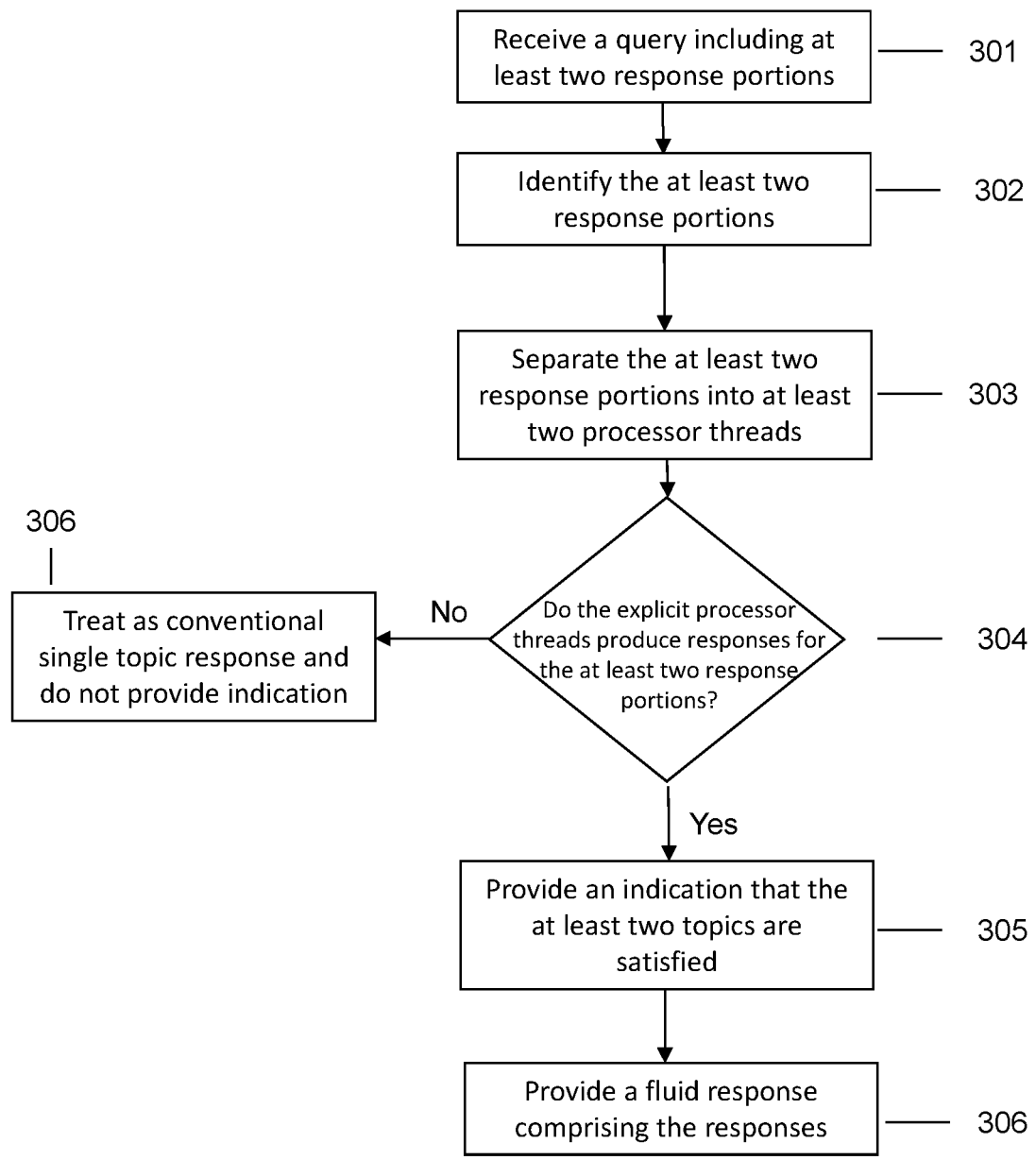
FIG. 3 illustrates an example method producing a response for a received query that includes multiple response portions.

Referring now to FIG. 3 a method for providing a query containing multiple parts to a digital personal assistant (DPA) and the DPA providing a fluid response back to user answering each part present within the query is described. At 301, a DPA may receive a query from a user including at least two portions that each require a response, also referred to as a multi-response query or a query having multiple response portions. In an embodiment, a query provided by a user may be provided as a verbal query, a textual query, or the like.

At 302, a system may then identify the at least two response portions contained within the user provided query. Each of the response portions may be directed to the same topic or may be unrelated topics. The response portions may be related to theoretically anything that a DPA may recognize as a subject. In an embodiment, and used as a non-limiting example, the presence of multiple response portions in a user provided query may cause a system to identify the multiple response portions. Each of the response portions may be used as separate starting points for a path of research by the DPA. In an embodiment, and used as a non-limiting example, a user may provide a query comprising four separate topics, and after the four topics are identified, each of the topics may be used as a starting point for the DPA to provide responses associated with the topic.

In an embodiment, after a user provides the query, the system may parse the user query into required responses dependent on the response portions identified within a query. In a case where the topics and/or response portions contained within a query are closely related the response portions may be researched simultaneously. Thus, the topics that require a response may be grouped together and researched. For example, a user may query a DPA with, "what is the temperature today and will it rain?" A system may identify that the two response portions within the query are "temperature" and "will it rain." Rather than processing these two response portions separately, a system may recognize that the topics are closely related, e.g., both related to a weather forecast, and may determine that the query may be treated as containing a single topic and that they can be searched with a single search query, thereby reducing the use of processing resources.

Alternatively, if the response portions are not closely related, or are independent from each other, the system may need to process each portion separately using different processing threads. The determination that the at least two topics present in the query may require response is determined when the at least two response portions are considered to be independent of one another. In other words, response portions contained in a query that are deemed not closely related may require separate processing. Referring back to the example previously mentioned discussing the weather forecast, the topics of chance of rain and temperature may be researched together because of their similarities ability to be obtained from a single source, e.g., from a local news website. On the other end, a user query may include response portions that are vastly different which may require obtaining information related to each individual topic from different sources.

At 303, a system may separate the at least two response portions contained within a user query into at least two explicit processor threads. A processor thread may be understood throughout the specification as being an approach to obtaining information related to each topic. A processor thread may track the sources that a system may use to gather information utilized to produce a response. After the determination that the at least two response portions contained in a user query require a response, a system may separate the response portions and treat of each response portions as an origin point for research, e.g., when two response portions are present then two origin points are established. The research completed and associated with each topic may then be traced back to the topics initial origin point. This information may then be utilized by the system to improve research capabilities.

After a system performs the research while attempting to provide an accurate response to the response portions contained within the supplied user query, a system may determine if the information obtained does answer the recognized topics at 304. In other words, the information obtained related to a response portions must be associated with the user query rather than simply associated with a recognized topic. For example, assume that a user queries a system, "why is grass green and why is the sky blue?" When researching these topics a system may determine that grass is green because of the presence of chlorophyll within it. A system may also determine that the sky is blue because of the reflection of blue light off of air molecules. However, when researching why the sky was blue, a notable source may have claimed that the sky was blue because of the reflection of the ocean upward into the sky.

Thus, a system may utilize multiple sources of information when gathering the information used for response. In an embodiment that may run into topics with multiple "answers" to the topics, a system may determine the most accurate source by use of comparison between information similarities, legitimacy or educational recognition (e.g., awards, sources, etc.), and the like. If, a system determines that the information obtained related to a topic does not accurately respond to the query, at 306, the system then may not provide a response regarding the response portion with the determined inaccurate information.

After all the information regarding the response portions contained within the user query have been obtained and the response portions are satisfied, a system may provide an indication to a user indicating that all parts of the query have been satisfied at 305. The indication (e.g., a visual indication, an audio indication, a haptic indication, etc.) may be provided to a user when all topics of a query are deemed satisfied. In an embodiment, a query may contain a plurality of response portions. As the number of response portions within a query increases the time spent on producing a response may also increase. Rather than a user providing a multi-response query and staring aimlessly at a DPA until a response is given, a system may provide an indication to a user notifying the user that the response portions within the multi-topic query have been satisfied. In other words, as the DPA obtains results to a response portion, an indication may be provided that indicates that response portion has a result. As the DPA obtains results for each response portion, a new indication corresponding to a response portion may be provided. Thus, the user can see which response portions have results.

In an embodiment, after a user is provided an indication, a user may provide a query to a DPA instructing a system to provide the response to a response portion even if the other response portions do not yet have results. Otherwise, in an embodiment, a system may hold on to the information obtained for a query for a predetermined amount of time, or until a system is instructed by a user. In an embodiment, a response to the multi-response query may be provided after the indication is given and a predetermined amount of time has passed, e.g., 5 seconds after the indication is provided. In an embodiment, the indication and the response may be provided at the same time.

At 306, a system may produce a fluid response including the responses associated with the response portions present in the user query. A response may be considered fluid when compared to natural human speech. In other words, the system may use natural language modeling techniques to generate a single response that responds to all portions of the query in a manner similar to how a human would respond to the multi-response query. Machine learning techniques may be utilized when producing a fluid response include the topic information. In an embodiment, in response to a query comprising two response portions, a system may use parts of speech to create a natural sounding response. For example, the use of conjugations may be present when discussing more than one topic in a singular response. In an embodiment, a system may access a database comprising natural spoken phrases. The implementation of natural language may provide a system with the ability to provide a timely response. As a fluid response example, in response to the previous user query example regarding the color of grass and the sky, a digital personal assistant may produce a fluid response similar to, "Grass is green because of the presence of chlorophyll, and the sky is blue because of the blue light that reflects off of the air molecules in the atmosphere." In an embodiment, the response provided by the digital personal assistant may be a clear and easy to understand sentence.

The various embodiments described herein thus represent a technical improvement to conventional methods for answering multi-response user queries via a digital personal assistant. Using the techniques described herein, an embodiment may permit the receiving of multi-response queries from a user. An embodiment may then determine whether the topics present in a multi-response query may be researched together or separately, and in the instance that the topics need to be researched separately, separating the topics into a necessary amount of processor threads. A determination of whether the research associated with a response portion satisfies the user query may be made, and an indication provided to a user describing that the topics present in the multi-response query have been satisfied may occur. A digital personal assistant may then provide a fluid response comprising the plurality of response portions present in a user query, the fluid response being a single response comprising the information related to all response portions that may require a response. Such a method may improve the overall quality of interactions with and responses provided by digital personal assistants.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising: receiving, at a digital assistant of an information handling device, a query from a user comprising at least two response portions; identifying, from the query, for each of the at least two response portions, a starting point for a path of research for the digital assistant, each of the paths of research being associated with an explicit processor thread; determining, from the at least two paths of research, responses for the at least two response portions, wherein the determining comprises separately processing each of the at least two response portions using the explicit processor thread corresponding to the response portion; and providing a response to the user comprising the responses, wherein the providing the response comprises providing a fluid response incorporating the responses for the at least two response portions, wherein the fluid response is generated utilizing natural language and machine learning techniques.

2. The method of claim 1, wherein the separately processing comprises separating the at least two response portions and sending each of the response portions to one of a plurality of processing unit threads.

3. The method of claim 1, wherein the query comprises a multi-part query and wherein each of the at least one response portions corresponds to a part of the multi-part query.

4. The method of claim 1, wherein the providing the response comprises providing a single response comprising information that satisfies the at least two response portions.

5. The method of claim 1, comprising providing an indication to a user after the responses are determined.

6. The method of claim 5, wherein the indication is selected from the group consisting of: an audible indication, a visual indication, and a haptic indication.

7. The method of claim 5, wherein the providing an indication comprises providing an indication as a response is determined for each of the at least two response portions.

8. The method of claim 7, wherein the indication is different for each of the at least two response portions.

9. The method of claim 1, wherein the providing is responsive to determining a response for all of the at least two response portions.

10. An information handling device, comprising: a processor; a memory device that stores instructions executable by the processor to: receive, at a digital assistant of an information handling device, a query from a user comprising at least two response portions; identify, from the query, for each of the at least two response portions, a starting point for a path of research for the digital assistant, each of the paths of research being associated with an explicit processor thread; determine, from the at least two paths of research, responses for the at least two response portions, wherein the determining comprises separately processing each of the at least two response portions using the explicit processor thread corresponding to the response portion; and provide a response to the user comprising the responses, wherein the providing the response comprises providing a fluid response incorporating the responses for the at least two response portions, wherein the fluid response is generated utilizing natural language and machine learning techniques.

11. The information handling device of claim 10, wherein the separately processing comprises separating the at least two response portions and sending each of the response portions to one of a plurality of processing unit threads.

12. The information handling device of claim 10, wherein the query comprises a multi-part query and wherein each of the at least one response portions corresponds to a part of the multi-part query.

13. The information handling device of claim 10, wherein the instructions executable by the processor to provide the response comprise instructions executable by the processor to provide a single response comprising information that satisfies the at least two response portions.

14. The information handling device of claim 10, comprising instructions executable by the processor to provide an indication to a user after the responses are determined.

15. The information handling device of claim 14, wherein the instructions executable by the processor to provide an indication comprise instructions executable by the processor to provide an indication as a response is determined for each of the at least two response portions.

16. The information handling device of claim 15, wherein the indication is different for each of the at least two response portions.

17. The information handling device of claim 10, wherein the instructions executable by the processor to provide is responsive to determining a response for all of the at least two response portions.

18. A product, comprising: a storage device that stores code, the code being executable by a processor and comprising: code that receives, at a digital assistant of an information handling device, a query from a user comprising at least two response portions; code that identifies, from the query, for each of the at least two response portions, a starting point for a path of research for the digital assistant, each of the paths of research being associated with an explicit processor thread; code that determines, from the at least two paths of research, responses for the at least two response portions, wherein the determining comprises separately processing each of the at least two response portions using the explicit processor thread corresponding to the response portion; and code that provides a response to the user comprising the responses, wherein the providing the response comprises providing a fluid response incorporating the responses for the at least two response portions, wherein the fluid response is generated utilizing natural language and machine learning techniques.

* * * * *